United States Patent [19]
Rim

[11] Patent Number: 6,134,272
[45] Date of Patent: Oct. 17, 2000

[54] DATA INPUT/OUTPUT APPARATUS OF TRANSPORT DECODER

[75] Inventor: Chai Yeol Rim, Seoul, Rep. of Korea

[73] Assignee: LG Electronics, Inc., Rep. of Korea

[21] Appl. No.: 08/773,418

[22] Filed: Dec. 27, 1996

[30] Foreign Application Priority Data

Jan. 5, 1996 [KR] Rep. of Korea .............................. 96-82

[51] Int. Cl.⁷ .............................. H04N 7/12; H04N 11/02; H04N 11/04
[52] U.S. Cl. .................. 375/240.27; 348/423; 348/845.2
[58] Field of Search .............................. 348/845.2, 423; 370/392, 535; H04N 7/12, 11/02, 11/04

[56] References Cited

U.S. PATENT DOCUMENTS

| | | | |
|---|---|---|---|
| 5,289,584 | 2/1994 | Thome et al. .......................... | 711/109 |
| 5,521,918 | 5/1996 | Kim ........................................... | 348/10 |
| 5,559,999 | 9/1996 | Maturi et al. ........................... | 395/550 |
| 5,619,501 | 4/1997 | Tamer et al. ............................ | 370/392 |
| 5,684,804 | 11/1997 | Baronetti et al. ...................... | 370/509 |
| 5,841,472 | 11/1998 | Rim et al. ............................... | 348/390 |
| 5,898,695 | 4/1999 | Fujii et al. ............................... | 348/10 |
| 5,959,659 | 9/1999 | Dokic ...................................... | 348/423 |

*Primary Examiner*—Chris S. Kelley
*Assistant Examiner*—Nhon T. Diep
*Attorney, Agent, or Firm*—Long, Aldridge & Norman

[57] ABSTRACT

A data input/output apparatus of a transport decoder. The apparatus has a memory and a transport packet decoder for storing input image bit stream in the memory, after performing a decoding with the input image bit stream, storing and outputting only needed data, and outputting the rest data to outside.

16 Claims, 11 Drawing Sheets

DATA INPUT/OUTPUT APPARATUS OF TRANSPORT DECODER

BACKGROUND OF THE INVENTION

1. Field of the Invention

The present invention relates to a MPEG2 (Motion Picture Expert Group-2) transport decoder, and more particular to a data input/output apparatus of the MPEG2 transport decoder for storing packet data in a memory during decoding of a transport, and for outputting the decoded packet data to video/audio decoders.

2. Discussion of Related Art

In general, the transport decoder inputs a transport input stream from a FEC(Forward Error Correction) part and a format of a DSM, and selects the packet required during the decoding of the video/audio decoders to perform a transport header decoding, an adaptation field decoding, and a packetized element stream header decoding.

Further, the transport decoder stores the decoded data in a transport memory and outputs video/audio compression data to the video/audio decoders.

FIG. 1 is a construction diagram of a data input/output apparatus of a transport decoder according to the prior art. Referring to FIG. 1, there are provided in FIG. 1 an input buffer 1, a transport packet decoder 5, video and audio buffers 3 and 4, a buffer 2 for PSI/PGI, a transport memory 7, and a transport memory interface controlling part 6. The input buffer 1 temporarily stores transport input stream and outputs it. The transport packet decoder 5 decodes the transport input bit stream from the input buffer 1 according to a transport packet method, and outputs the video/audio compression data and PSI/PGI data, respectively. The video and audio buffers 3 and 4 temporarily store the video and audio compression data outputted from the transport packet decoder 5 and then output the data to the video/audio decoders. The buffer 2 for PSI/PGI temporarily stores and outputs the PSI/PGI data outputted from the transport packet decoder 5. The transport memory 7 stores the data outputted from the buffer 2 according to an address control signal and a read/write control signal. And, the transport memory interface controlling part 6 provides the address control signal and the read/write control signal.

The operation of each of the parts of FIG. 1 is as follows.

First of all, the input buffer 1 receives the transport input stream and inputs the transport input stream to the transport packet decoder 5 for the transport packet decoding. At this time, the transport input stream can be inputted as a burst mode, or can be inputted with a consecutive clock signal. Further, the transport packet decoder 5 selects the packet needed in the decoding of the video/audio decoders and then performs the transport header decoding, the adaptation field decoding, and the PES header decoding. Thereafter, the video and audio compression data are transferred to the video/audio decoders (not shown) through the video and audio buffers 3 and 4, and the PSI (Program Specific Information) data and the PGI(Program Guide Information) data are stored in the transport memory 7 through the buffer 2 for PSI/PGI.

The video/audio data are outputted to the video/audio decoders through the video and audio buffers 3 and 4 whenever decoded in the transport packet decoder 5. The address and read/write control signals of the transport memory 7 are generated from the transport memory interface controlling part 6 and then provided to the transport memory 7.

In the meantime, the address areas of the transport memory 7 for storing the PSI and PGI data are determined by an internal register of the transport memory interface controlling part 6, and the transport memory 7 generates the address and control signals so that the PSI and PGI data can be stored in the determined areas.

Therefore, the address map of the transport memory 7 is shown in FIG. 2. In order words, PSI 1 data is stored in addresses AA . . . A to BB . . . B, and PGI 1 data is also stored in addresses aa . . . a to bb . . . b-1.

However, the data input/output apparatus of the transport decoder according to the prior art stores the packet data in the input buffer 1, and the transport packet decoder 5 decodes the input data. At this time, if a decoding time is long in the transport packet decoder 5, there may arise overflow in the input buffer 1 because the input buffer 1 stores the transport input stream to be consecutively inputted. Further, in order to prevent the overflow, there may arise the other problem in that the input buffer should be large in its capacity. Furthermore, even though the decoding time is short in the transport packet decoder 5, if the decoded video/audio data are not normally outputted through the video and audio buffers 3 and 4 because of the decoding delay of the video/audio decoders, there also may arise overflow in the video and audio buffers 3 and 4. Moreover, according to the prior art, the use of a fixed memory map of the transport memory interface controlling part 6 reduces efficiency of the transport memory.

SUMMARY OF THE INVENTION

Accordingly, an object of the present invention is to provide a data input/output apparatus of a transport decoder which prevents an input buffer from overflowing under a fact that transport input stream is stored in a transport memory through the input buffer, and also prevents video and audio buffers from overflowing by making a state that video and audio compression data are not outputted to the video and audio buffers even though the decoding of video/audio decoders is delayed.

The other object of the present invention is to provide a data input/output apparatus of a transport decoder which can increase efficiency in use of the transport memory and in a write/read operation of the transport memory by selectively inputting data needed in only the decoding.

Another object of the present invention is to provide a data input/output apparatus of a transport decoder which can efficiently utilize a changeable memory assignment function in the transport memory.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above objects in accordance with the present invention, as embodied and broadly described, the data input/output of the transport decoder comprises a first buffer for temporarily storing the transport input stream; a transport memory for storing an output of the first buffer; a transport packet decoder for selecting packets needed in decoding of video/audio decoders and for performing a packet decoding; a second buffer for inputting the data stored in the transport memory to the transport packet decoder; a third buffer for inputting the decoded data the transport packet decoder to the transport memory; fourth and fifth buffers for inputting video and audio compression data from the transport packet decoder to video/audio decoders, respectively; and a transport memory interface controlling part for outputting an address and a read/write control signal to the transport memory.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

The First Embodiment of the Preset Invention

Figure 3:
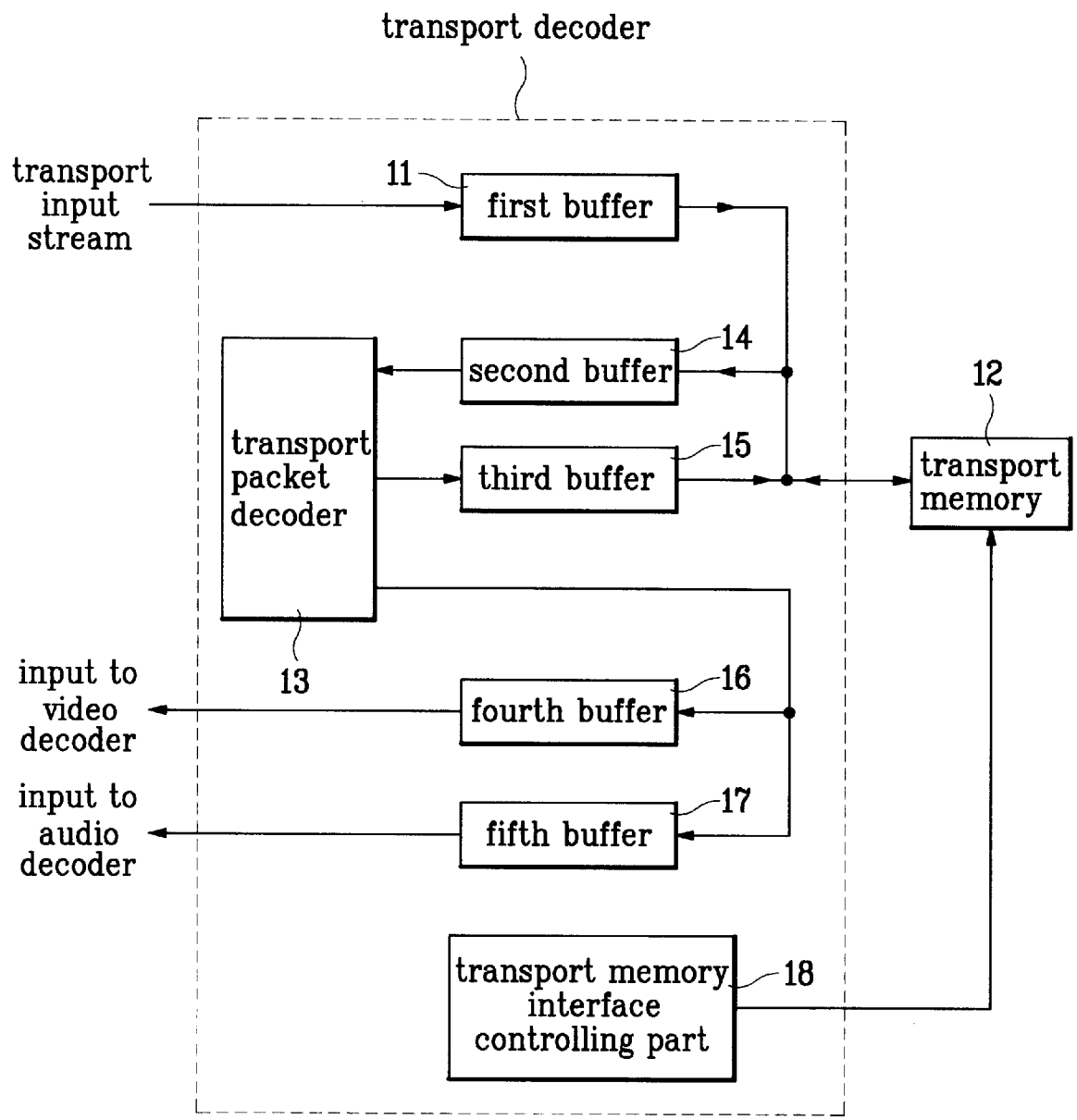
FIG. 3 is a block construction diagram of a data input/output apparatus of the transport decoder according to the first embodiment of the present invention.
Figure 4:
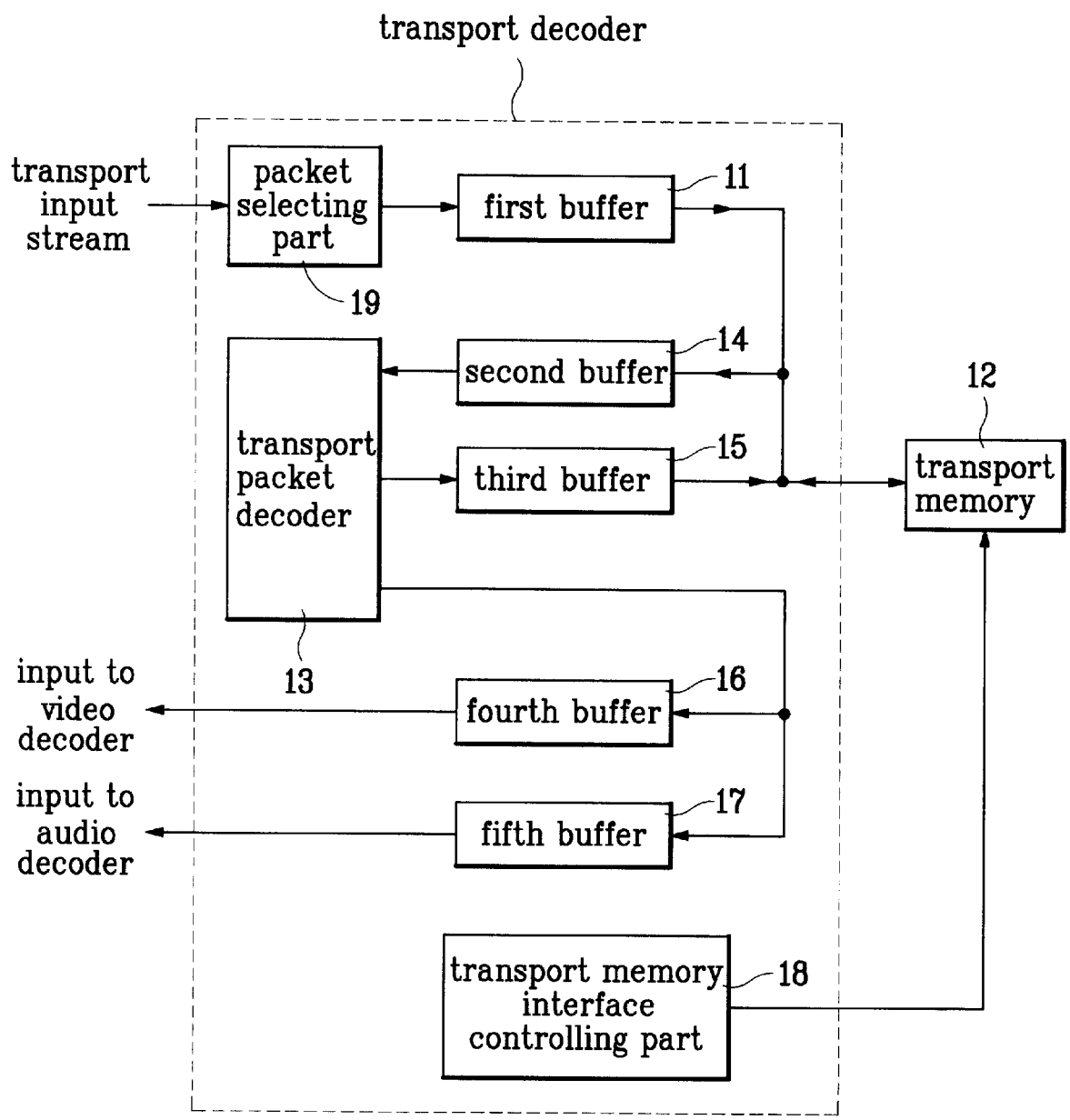
FIG. 4 is a block construction diagram of a data input/output apparatus of the transport decoder for selecting and decoding a desirous packet among input transport stream, which is a changed embodiment from FIG. 3.

FIG. 3 is a block construction diagram of a data input/output apparatus of the transport decoder according to the first embodiment of the present invention. FIG. 4 is a block construction diagram of a data input/output apparatus of the transport decoder for selecting and decoding a desirous packet among input transport stream, which is a changed embodiment from FIG. 3.

Referring to FIG. 3 there are provided in the data input/output apparatus of the transport decoder, a first buffer 11, a transport memory 12, a transport packet decoder 13, a second buffer 14, a third buffer 15, fourth and fifth buffers 16 and 17, and a transport memory interface controlling part 18. The first buffer 11 temporarily stores the transport input stream. The transport memory 12 stores an output of the first buffer 11 and is composed of DRAM and SRAM. The transport packet decoder 13 selects packet needed in the decoding of the video/audio decoders and performs a transport header decoding, an adaptation field decoding, and a PES header decoding. The second buffer 14 inputs the transport input stream stored in the transport memory 12 to the transport packet decoder 13. The third buffer 15 stores PSI (Program Specific Information) data and PGI (Program Guide Information) data in the transport memory 12. The fourth and fifth buffers 16 and 17 input video and audio compression data from the transport packet decoder 13 to the video/audio decoders, respectively. And, the transport memory interface controlling part 18 outputs an address and a read/write control signal of the transport memory 12. The transport memory can be composed of the DRAM or SRAM.

The operation of each of the parts of the data input/output apparatus is as follows.

The transport input steam is stored in the transport memory 12 through the first buffer 11. The address and read/write control signals of the transport memory 12 are generated from the transport memory interface controlling part 18. Data stored in the transport memory 12 is read from the second buffer and then decoded in the transport packet decoder 13. The decoded PGI and PSI data are again stored in the transport memory 12 through the third buffer 15, and the video and audio compression data are outputted to the video/audio decoders through the fourth and fifth buffers 16 and 17.

Therefore, it does not matter if the capacity of the first buffer is small. Further, when the data are congested in the fourth and fifth buffers 16 and 17 because of the decoding delay of the video/audio decoders, even though the transport packet decode 13 waits until the video/audio data are outputted, the overflow will not arise in the fourth and fifth buffers 16 and 17.

At the moment, if the data are not outputted from the transport packet decoder 13, the efficiency of the decoding of the transport packet decoder 13 may fall. Further, output control of the data of the transport packet decoder 13 is executed by an additional controlling part (not shown).

In the meantime, in FIG. 4 a packet selecting part 19 is further included in the front side of the first buffer 11. The packet selecting part 19 is intended to store only the data needed in the decoding in the transport memory 12. The transport input stream is stored in the transport memory 12 through the first buffer 11, and not all the stored data are necessary for the decoding. Thereby, the efficiency of the first and second buffers 11 and 14 will fall. In order words, since the needed data among the transport input steam is less than ⅓, it is desired that only the data required in the decoding is stored in the transport memory 12 and is then read therefrom, so that it is possible to increase the efficiency of the input/output of the transport memory 12. That is why the packet selecting part 19 is further constructed in the front side of the first buffer 11.

On the other hand, most transport memories are implemented by the DRAM and it is thus desired that a fast page mode or a static column access is utilized to perform the input/output operation at high speed.

In order to achieve such memory access, several data should be simultaneously accessed in the same row address.

That is, the buffers 11, 14, 15, 16, and 17 shown in FIGS. 3 and 4 are implemented as a dual construction to access the DRAM at the high speed.

The Second Embodiment of the Present Invention

Figure 1:
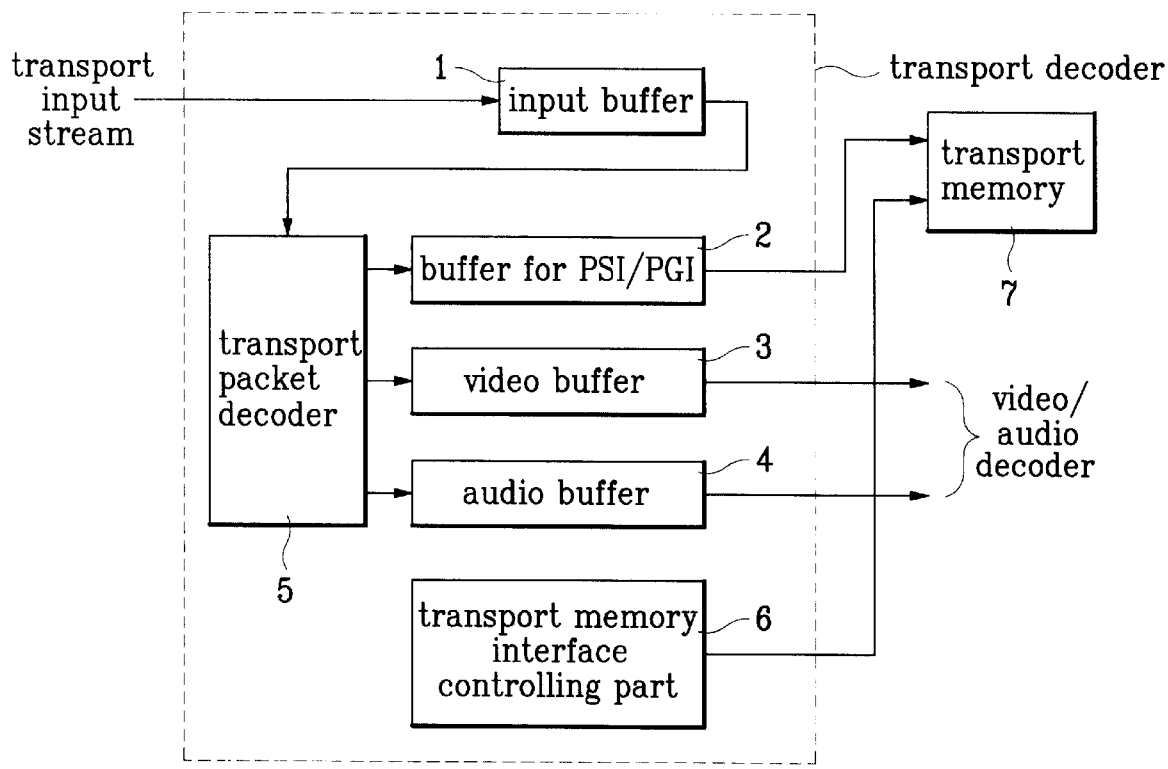
FIG. 1 is a construction diagram of a data input/output of a transport decoder according to the prior art.
Figure 2:
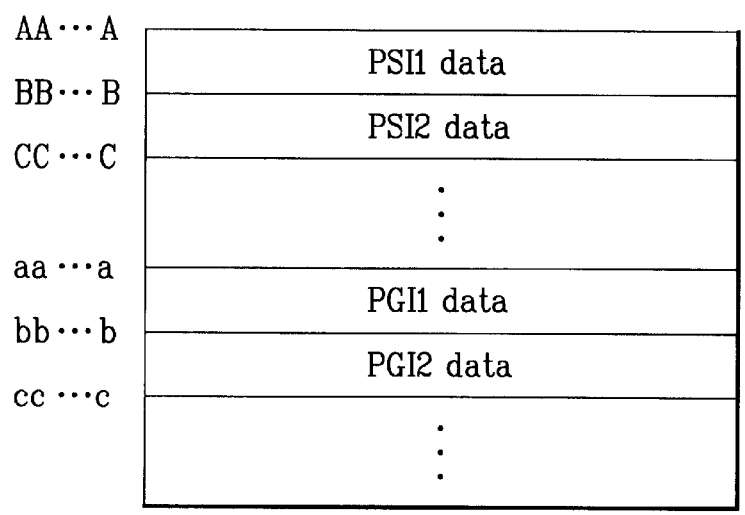
FIG. 2 is a diagram illustrating an address map of a transport memory of FIG. 1.
Figure 5:
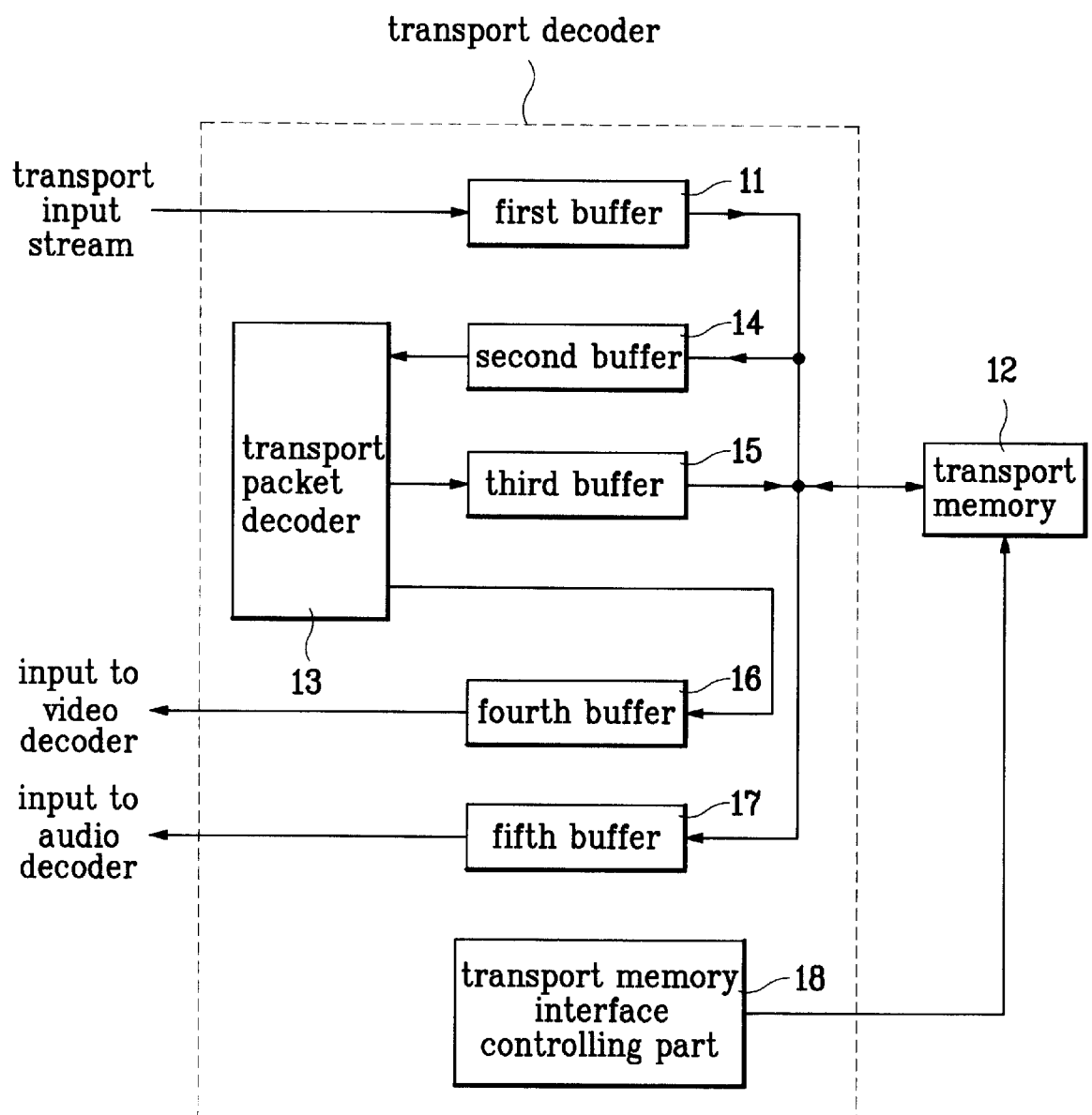
FIG. 5 is a block construction diagram of a data input/output apparatus of the transport decoder according to the second embodiment of the present invention.
Figure 6:
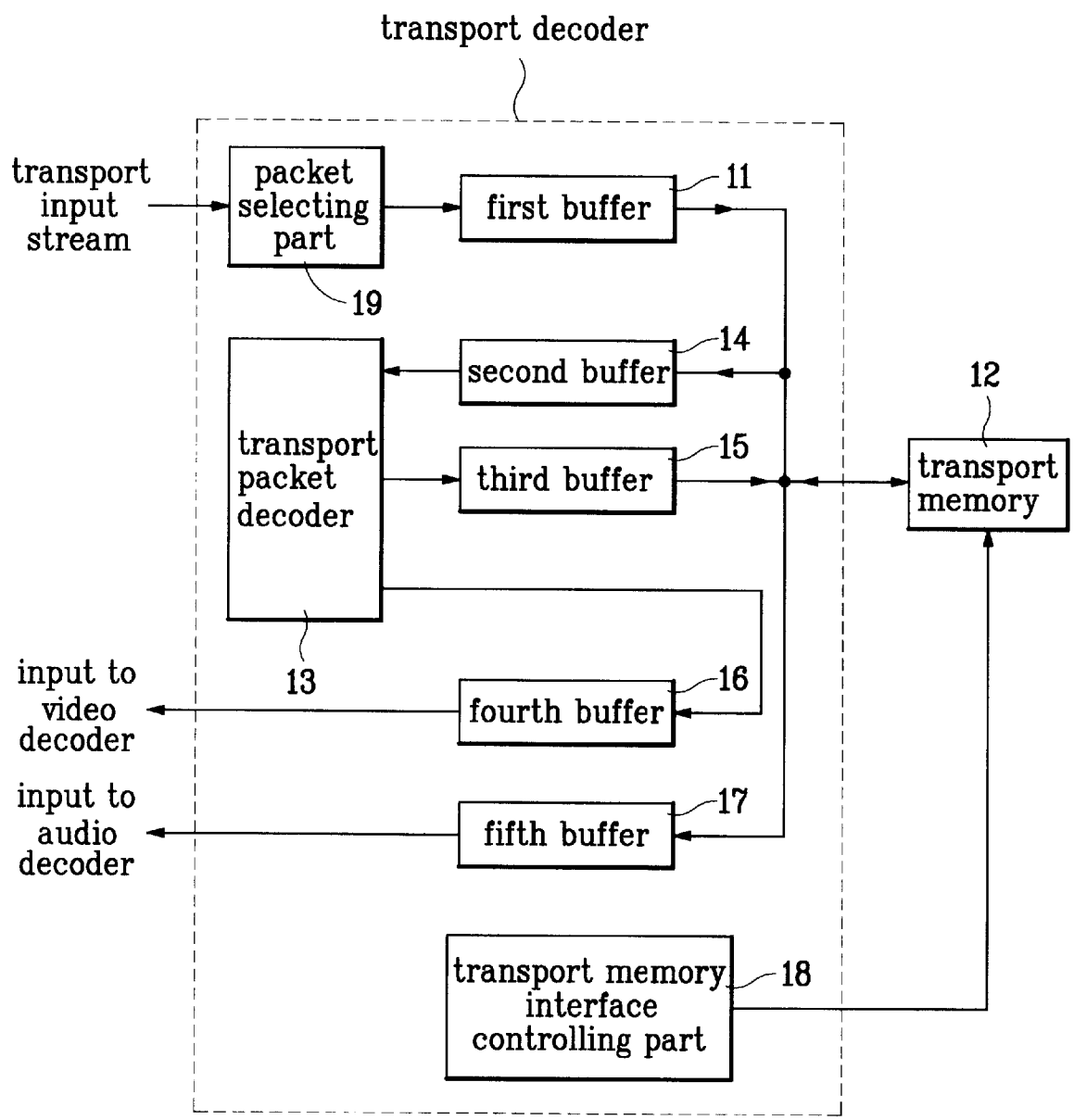
FIG. 6 is a block construction diagram of a data input/output apparatus of the transport decoder for selecting and decoding a desirous packet among input transport stream, which is a changed embodiment from FIG. 5.

FIG. 5 is a block construction diagram of a data input/output apparatus of the transport decoder according to the second embodiment of the present invention. FIG. 6 is a block construction diagram of a data input/output apparatus of the transport decoder for selecting and decoding a desirous packet among input transport stream, which is a changed embodiment from FIG. 5. The same constructions of FIGS. 5 and 6 as those of FIG. 1 will not be explained.

Referring to FIG. 5, the audio compression data of the transport packet decode 13 is inputted through the transport memory 12 without passing through the fifth buffer 17.

Meantime, most audio decoders do not have the memory because they are not employed to store frame data of great capacity, like the video decoder. Thus, the audio decoder has only a data buffer for decoding the present frame and can not store a lots of data thus. Therefore, the transport packet decoder 13 is operated only while the data are outputted to the audio decoder because of the delay of the audio decoder, and for long time it has to wait that the data are transferred. Thereby, the efficiency of the transport packet decoder 13 is reduced.

Accordingly, in the second embodiment of the present invention the audio compression data stored in the transport memory 12 through the first buffer 11, is inputted to the transport packet decoder 13 through the second buffer 14 and is again stored in the transport memory 12. Thereafter, if the audio decoder is prepared to input the data, the compression audio data stored in the transport memory 12 is read through the fifth buffer 17 and is then outputted to the audio decoder. Thereby, the decoding efficiency of the transport packet decoder 13 is increased. Here, the video compression data outputted from the transport packet decoder 13 may be directly inputted to the video decoder without passing through the fourth buffer 16.

Since the rest operations in the second embodiment are the same as those in the first embodiment, explanation thereon will be omitted.

In the meantime, in FIG. 6 a packet selecting part 19 is further included in the front side of the first buffer 11. The packet selecting part 19 is intended to store only the data needed in the decoding in the transport memory 12. The transport input stream is stored in the transport memory 12 through the first buffer 11, and not all the stored data are necessary for the decoding. Thereby, the efficiency of the first and second buffers 11 and 14 will fall. In order words, since the needed data among the transport input steam is less than ⅓, it is desired that only the data required in the decoding is stored in the transport memory 12 and is then read therefrom, so that it is possible to increase the efficiency of the input/output of the transport memory 12. That is why the packet selecting part 19 is further constructed in the front side of the first buffer 11.

On the other hand, most transport memories are implemented by the DRAM and it is thus desired that a fast page mode or a static column access is utilized to perform the input/output operation at high speed.

In order to achieve such memory access, several data should be simultaneously accessed in the same row address. That is, the buffers 11, 14, 15, 16, and 17 shown in FIGS. 3 and 4 are implemented as a dual construction to access the DRAM at the high speed.

The Third Embodiment of the Present Invention

Figure 7:
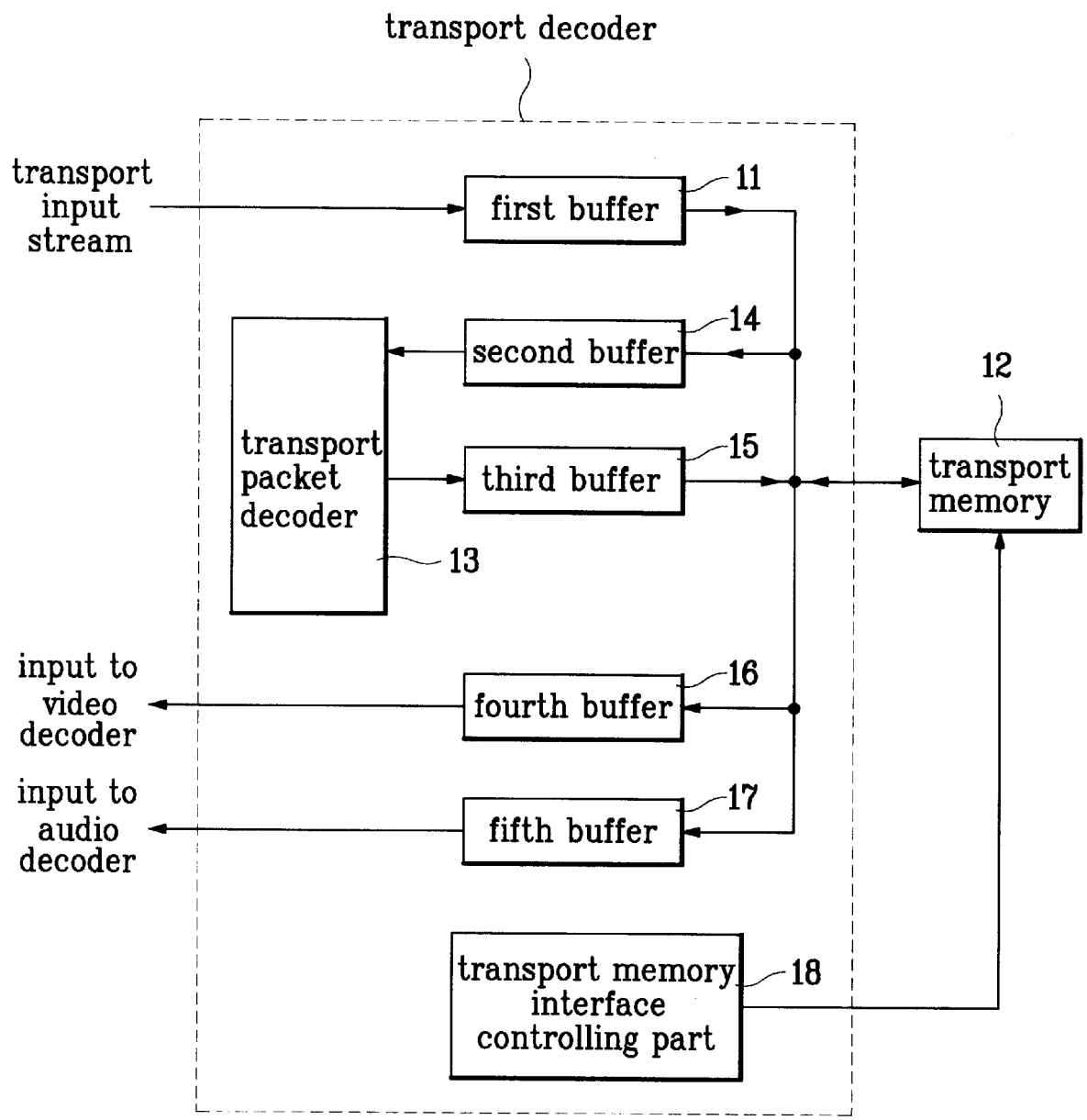
FIG. 7 is a block construction diagram of a data input/output apparatus of the transport decoder according to the third embodiment of the present invention.
Figure 8:
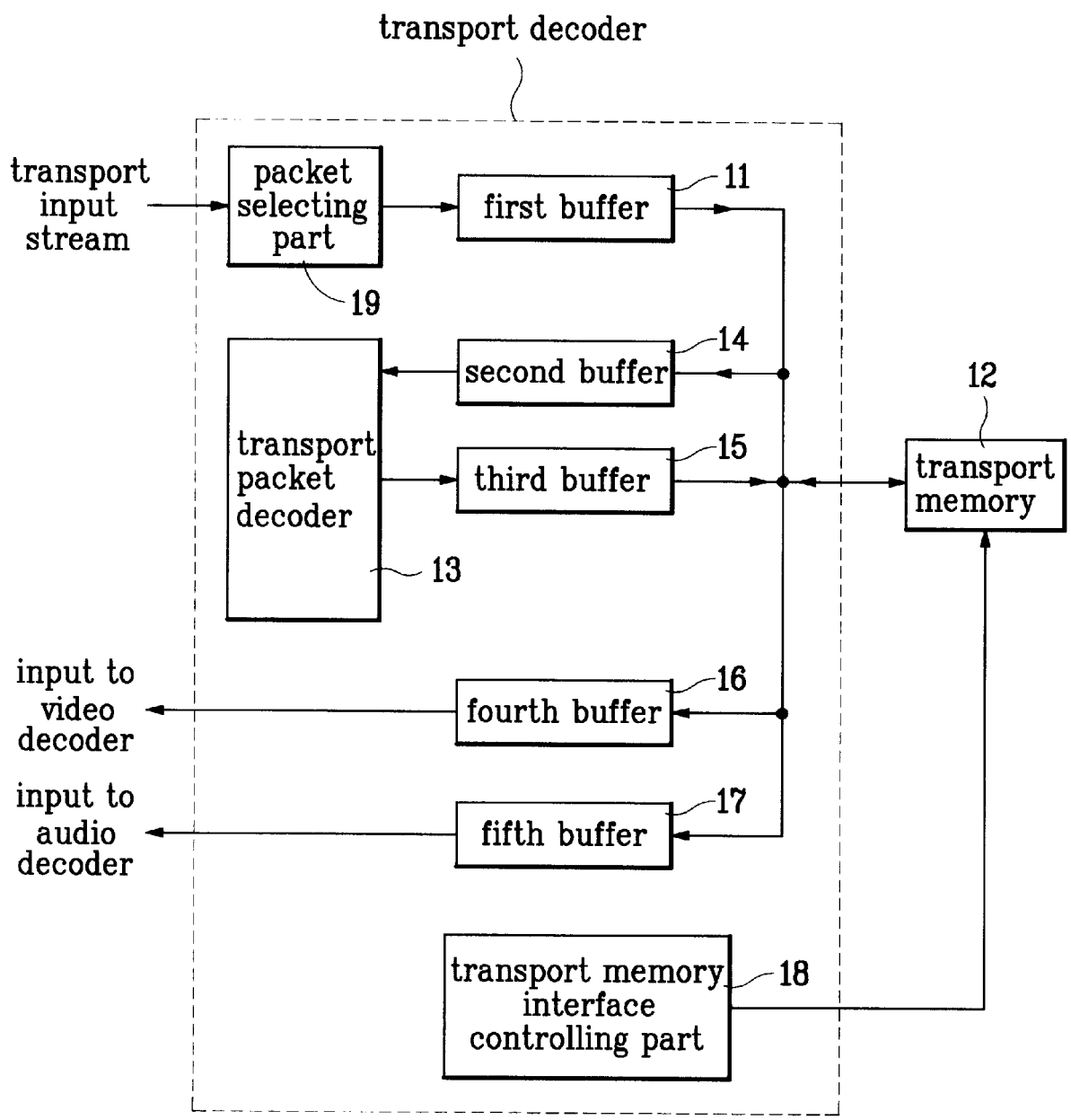
FIG. 8 is a block construction diagram of a data input/output apparatus of the transport decoder for selecting and decoding a desirous packet among input transport stream, which is a changed embodiment from FIG. 7.

FIG. 7 is a block construction diagram of a data input/output apparatus of the transport decoder according to the third embodiment of the present invention. FIG. 8 is a block construction diagram of a data input/output apparatus of the transport decoder for selecting and decoding a desirous packet among input transport stream, which is a changed embodiment from FIG. 7.

Referring to FIG. 7, the data are stored in the transport memory 12 through the first buffer 11 and is then inputted to the transport packet decoder 13 through the second buffer 14 according to an output control signal of the transport memory interface controlling part 18. The input data are decoded in the transport packet decoder 13 and the decoded video and audio compression data are stored in the transport memory 12 and outputted to the video and audio decoders through the fourth and fifth buffers 16 and 17.

The transport input stream in the third embodiment of the present invention is stored in the transport memory 12 through the first buffer 11. The transport memory 12 inputs the data to the transport packet decoder 13 through the second buffer 14 under control of the transport memory interface controlling part 18. The transport packet decoder 13 decodes the input data and also stores the PSI, the PGI, and the video/audio compression data in the transport memory 12 through the third buffer 15. The decoded video/audio compression data can be directly outputted to the transport memory 12 without passing through the third buffer 15. Further, the video/audio compression data stored in the transport memory 12 are inputted to the video and audio decoders through the fourth and fifth buffers 16 and 17 according to control of the transport memory interface controlling part 18. Thereby, it is possible to prevent the transport packet decoder 13 from being stopped according to the delay of the video and audio decoders.

In the meantime, in FIG. 8 a packet selecting part 19 is further included in the front side of the first buffer 11. The packet selecting part 19 is intended to store only the data needed in the decoding operation in the transport memory 12. The explanation is the same as FIGS. 4 and 6. Further, the buffers 11, 14, 15, 16, and 17 shown in FIGS. 3 and 4 are implemented as a dual construction.

Figure 9:
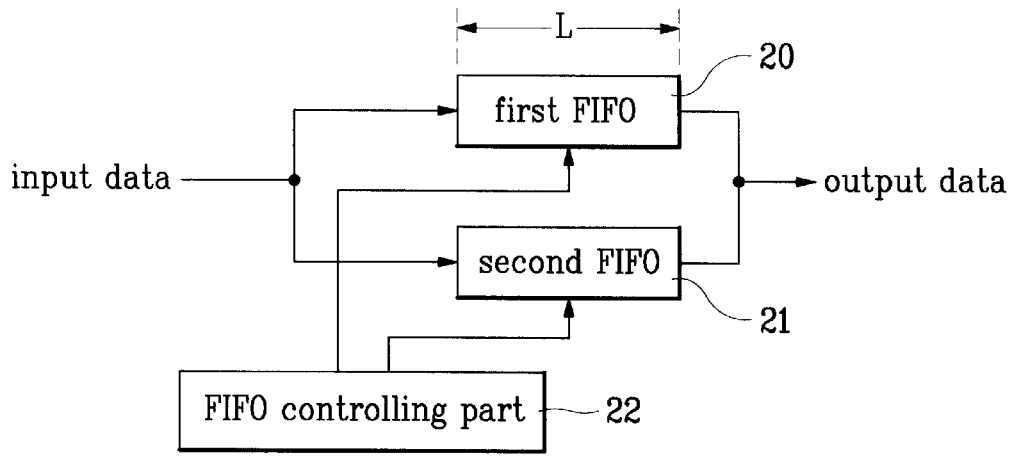
FIG. 9 is a detailed diagram of a buffer shown in FIGS. 3 to 8.

FIG. 9 is a detailed diagram of a buffer shown in FIGS. 3 to 8. Referring to FIG. 9, the dual buffer is composed of first and second FIFO 20 and 21, and a FIFO controlling part 22 for controlling the input/output of the first and second FIFO 20 and 21.

In the dual buffer, the input data are first stored in the first FIFO 20, and if the first FIFO 20 is full, the data are stored in the second FIFO 21. While the data are stored in the second FIFO 21, the data of the first FIFO 20 is stored in the DRAM by the fast page mode or the static column access. Thereafter, when the second FIFO is full, the data are again stored in the first FIFO 20. The data stored in the second FIFO 21 is stored in the DRAM at the high speed.

On the other hand, the transport memory interface controlling part 18 in the first to third embodiments of the present invention, stores the transport input stream in the transport memory 12 through the first buffer 11 according to the memory map of its initialized position and size. Thereafter, the transport input stream stored in the transport memory 12 is outputted to the second buffer 14 and is inputted to the transport packet decoder 13. The PSI and the PGI of the transport packet decoder 13, and the video/audio compression data are stored in the transport memory 12 through the third buffer 15. Further, the video/audio compression data stored in the transport memory 12 are inputted to the video and audio decoders through the fourth and fifth buffers 16 and 17.

However, in case that the data are stored according to the memory map of the fixed size, if the amount of the data can be not expected, the efficiency of the memory fall. Therefore, in order to more efficiently use the transport memory, the transport memory should not be determined by the map of a fixed size.

Accordingly, the present invention is subjected to provide the changeable memory assignment function to the transport memory interface controlling part 18, so that the transport memory can be efficiently utilized. Here, the changeable memory assignment function is to assign the memory according to the size of the data. Even though the size of the data are in advance not checked, it is possible to assign the memory, as shown in FIG. 10.

FIGS. 10A to 10D are diagrams illustrating a changeable capacity assignment method of the transport memory according to the present invention.

Figure 10A:
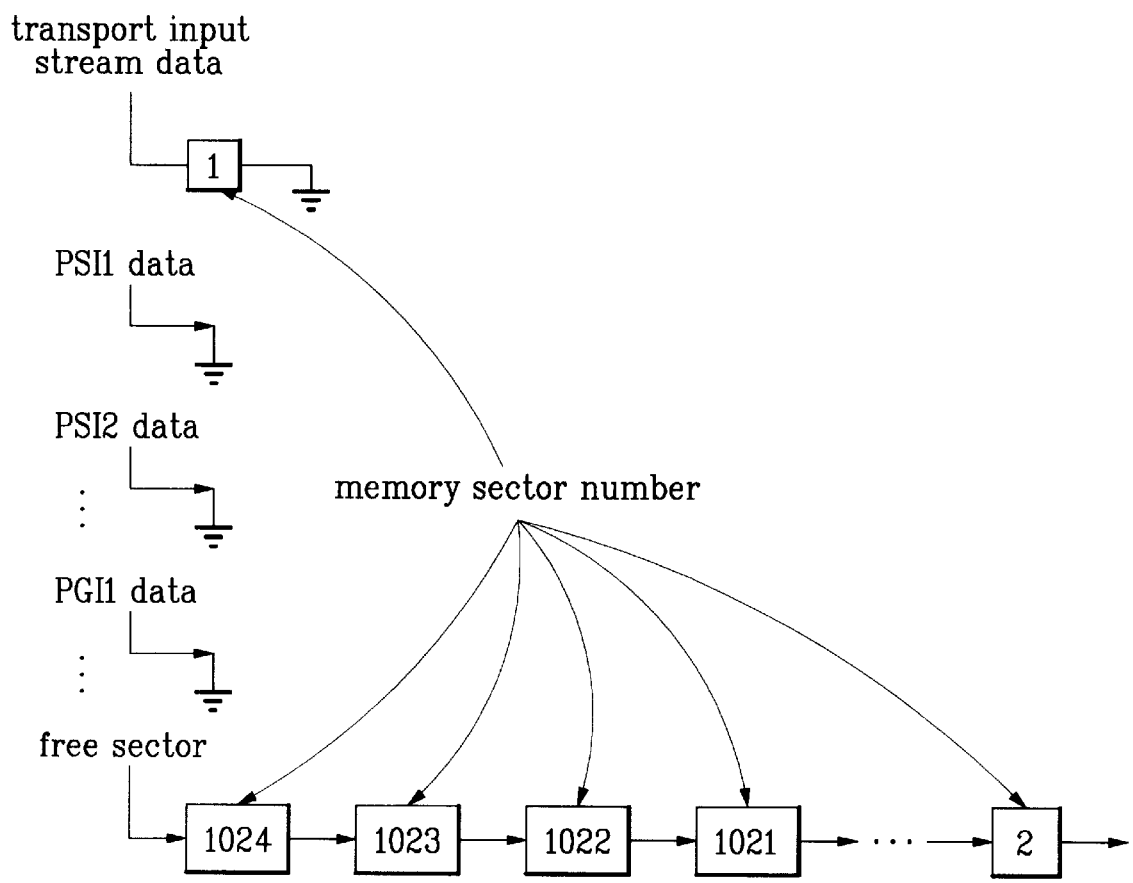
FIGS. 10A to 10D are diagrams illustrating a changeable memory assignment method of the transport memory according to the present invention.

Referring to FIGS. 10A to 10D, the memory is divided into sectors having constant sizes and a series of numbers are given to each sector. All the sectors are first at a free state. As shown in FIG. 10A, first of all, one sector is assigned to the transport input stream data to store it.

Figure 10B:
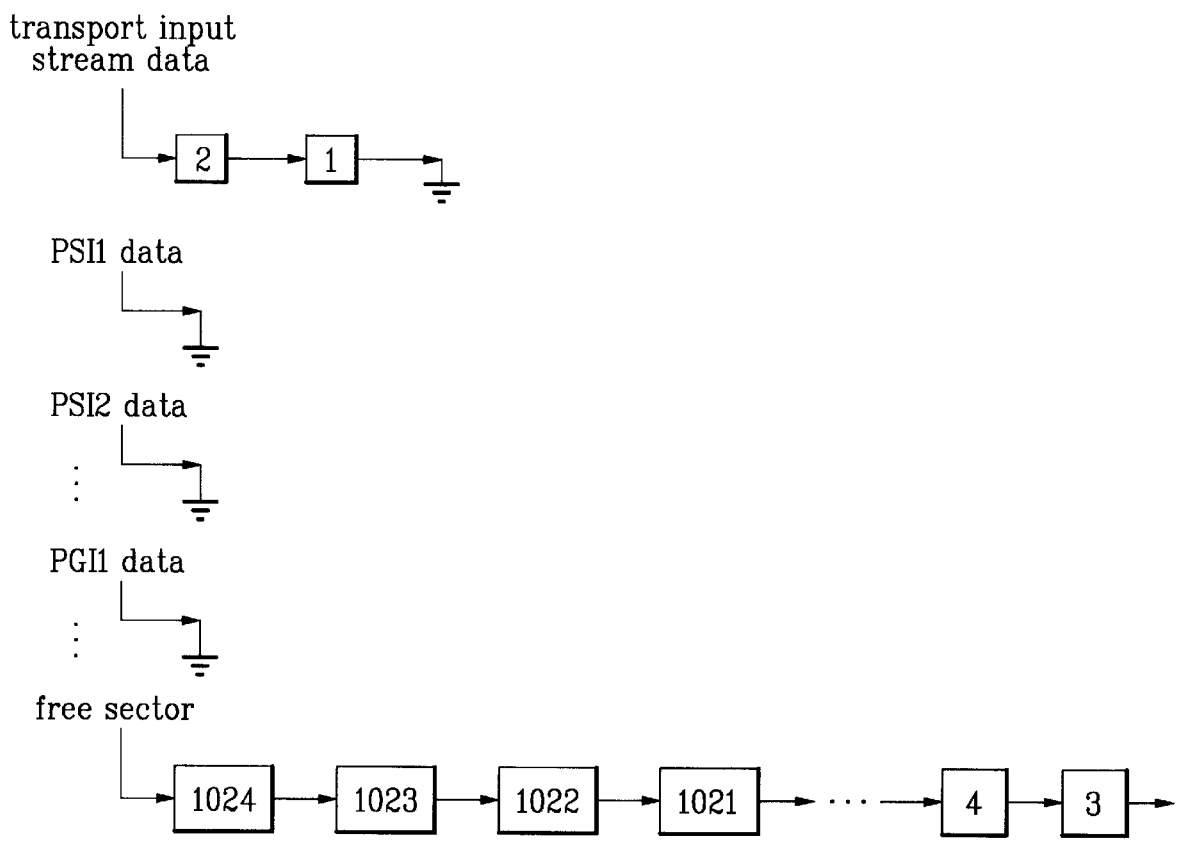
Figure 10C:
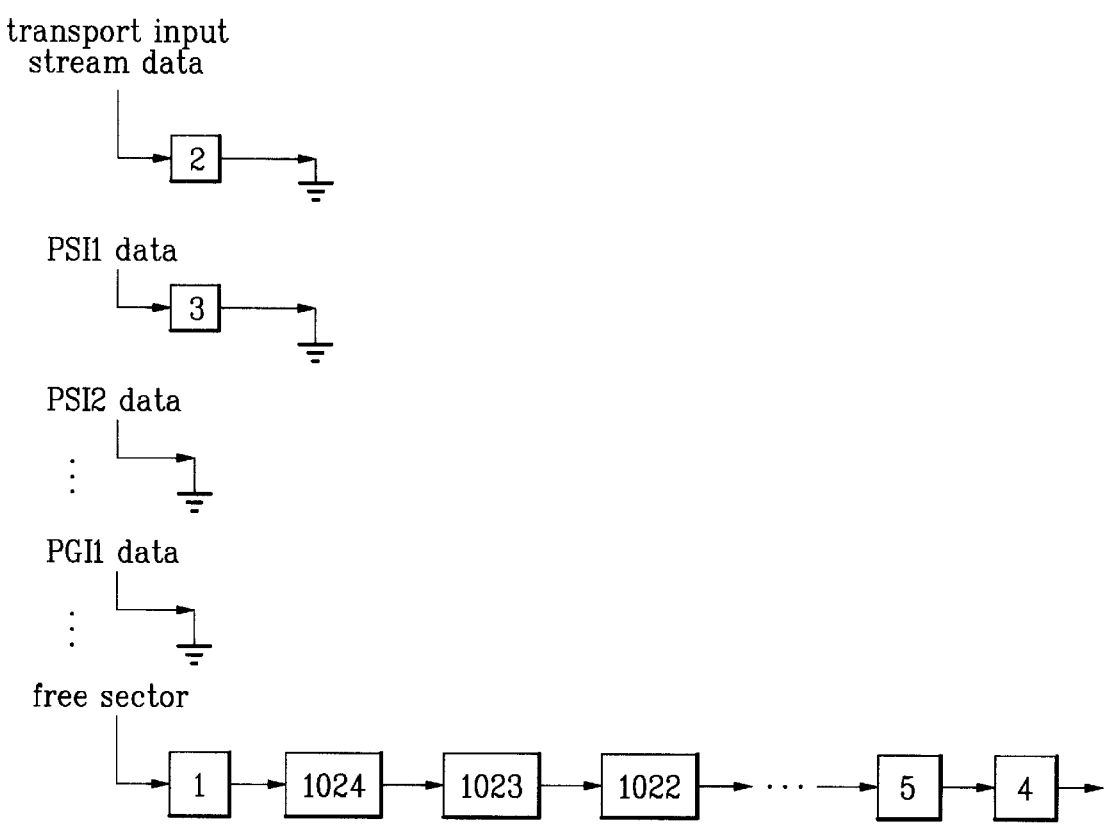

Further, if the data are again inputted when one sector is full, lots of the memories are needed. Then, as shown in FIG. 10B, the other sector is assigned from the free sector and the transport input stream is stored in a memory area of the sector 2. The stored data are read from a sector 1. After the data of the sector 1 is read, the sector 1, as shown in FIG. 10C, is again registered as the free sector. At this time, if the third buffer 15 requests a memory area to store the PSI data and the PGI data, another sector is again assigned from the free sector. The PSI data and the PGI data are stored in the memory area separately in their own form.

Figure 10D:
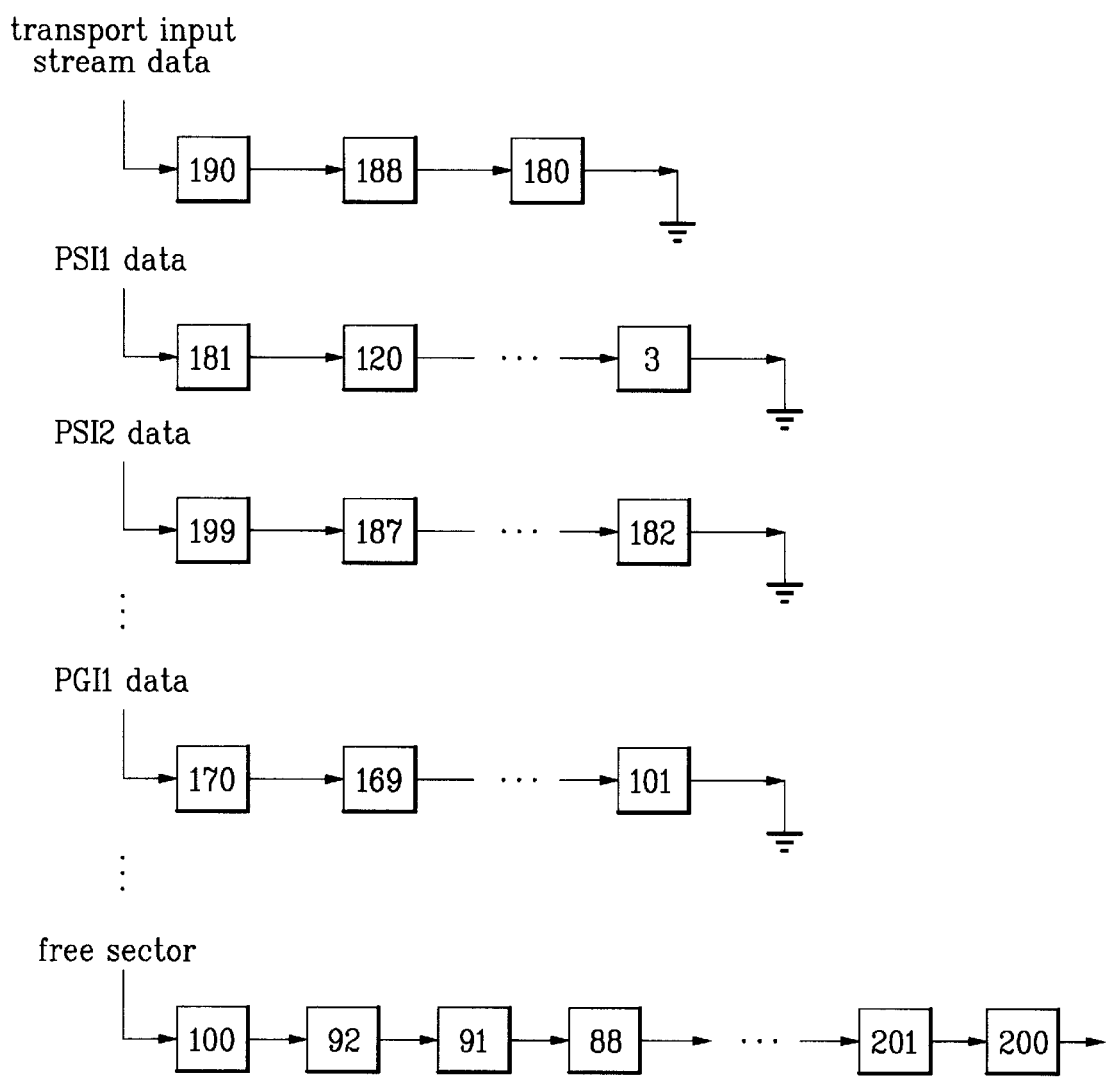

With repetition of such an operation, the memory can be used the most efficiently because the memory can be assigned and used as required as shown in FIG. 10D.

As mentioned above, the present invention is to store the transport input stream in the transport memory through the input buffers, thereby reducing the size of the input buffer.

Further, according to the present invention, since the output of the transport packet decoder is stored in the transport memory, it is possible to prevent the video and audio buffers from overflowing and also to prevent the transport packet decoder from being stopped.

Furthermore, according to the present invention, since there is selected and decoded only the needed data among the transport input stream and the transport memory has the changeable memory assignment function, the transport memory is efficiently used.

Moreover, according to the present invention, since there is implemented as a dual buffer each buffer for inputting/outputting the data of the transport memory, it is possible to access the data at the high speed.

It will be apparent to those skilled in the art that various modifications and variations can be made in the data input/output apparatus of the transport decoder of the present invention without departing from the spirit or scope of the invention. Thus, it is intended that the present invention cover the modifications and variations of this invention provided they come within the scope of the appended claims and their equivalents.

What is claimed is:

1. A data input/output apparatus of a MPEG2 (Motion Picture Expert Group-2) transport decoder comprising:
    a first buffer for temporarily storing a transport input stream;
    a transport memory for storing an output of said first buffer;
    a second buffer for receiving data from said transport memory and temporarily storing the data;
    a transport packet decoder for receiving an output of the second buffer and selecting packets needed for decoding by video/audio decoders, and for performing packet decoding;
    a third buffer for receiving decoded data from said transport packet decoder, temporarily storing the decoded data, and providing the decoded data to said transport memory;
    fourth and fifth buffers for receiving video and audio compression data from said transport packet decoder, temporarily storing the video and audio compression data, and providing the video and audio compression data to the video/audio decoders, respectively; and
    a transport interface controlling part for outputting an address and a read/write control signal to said transport memory.

2. The apparatus of claim 1, wherein said first to fifth buffers are dual buffers comprising:
    a first FIFO;
    a second FIFO; and
    a FIFO controlling part for controlling input/output of said first and second FIFOs.

3. The apparatus as claimed in claim 1, wherein said video/audio compression data are stored in said transport memory through said third buffer from said transport packet decoder, and are then outputted through said fourth and fifth buffers.

4. The apparatus as claimed in claim 1, wherein the audio compression data are stored in said transport memory through said third buffer from said transport packet decoder and then outputted to the audio decoder through said fifth buffer, and the video compression data are outputted to a video decoder through said fourth buffer from said transport packet decoder.

5. The apparatus as claimed in claim 1, further comprising a packet selecting part for selecting and providing to said first buffer only said needed packets from said transport input stream.

6. The apparatus as claimed in claim 1, wherein said transport memory is changeably assigned according to size of said input data.

7. The data input/output apparatus of claim 6, further comprising a packet selecting part receiving the transport input stream, selecting therefrom only packets needed by the transport decoder, and providing only the selected packets to the transport memory.

8. A data input/output apparatus for a transport decoder, comprising:
    a transport memory;
    a first buffer receiving and temporarily storing a transport input stream comprising data packets, and providing the transport input stream to the transport memory;
    a second buffer receiving the transport input stream from the transport memory and temporarily storing the transport input stream;
    a transport packet decoder receiving the transport input stream from the second buffer and decoding the data packets to produce data; and a third buffer receiving a first portion of the data from the transport packet decoder, temporarily storing the first portion of the data, and providing the first portion of the data to the transport memory.

9. The data input/output apparatus of claim 8, further comprising a fourth buffer receiving a second portion of the data comprising compressed video data from the transport packet decoder, temporarily storing the compressed video data, and providing the compressed video data to a video decoder.

10. The data input/output apparatus of claim 9, further comprising a fifth buffer receiving a third portion of the data comprising compressed audio data from the transport packet decoder, temporarily storing the compressed audio data, and providing the compressed audio data to an audio decoder.

11. The data input/output apparatus of claim 9, wherein the first portion of the data comprises program data.

12. The data input/output apparatus of claim 11, wherein the program data comprises Program Specific Information (PSI) and Program Guide Information (PGI).

13. The data input/output apparatus of claim 8, further comprising a fourth buffer receiving a part of the first portion of the data comprising compressed video data from the transport memory, temporarily storing the compressed video data, and providing the compressed video data to a video decoder.

14. The data input/output apparatus of claim 13, further comprising a fifth buffer receiving a second portion of the data comprising compressed audio data from the transport packet decoder, temporarily storing the compressed audio data, and providing the compressed audio data to an audio decoder.

15. The data input/output apparatus of claim 13, further comprising a fifth buffer receiving a second part of the first portion of the data comprising compressed audio data from the transport memory, temporarily storing the compressed audio data, and providing the compressed audio data to an audio decoder.

16. The data input/output apparatus of claim 8, further comprising a packet selector part receiving the transport input stream, selecting therefrom only packets needed by the transport decoder, and providing only the selected packets to the transport memory.

* * * * *